June 29, 1954  B. J. VINCENT  2,682,205
SCREEN PLATE FOR PAPERMAKING MACHINES
Filed June 28, 1949  2 Sheets-Sheet 2
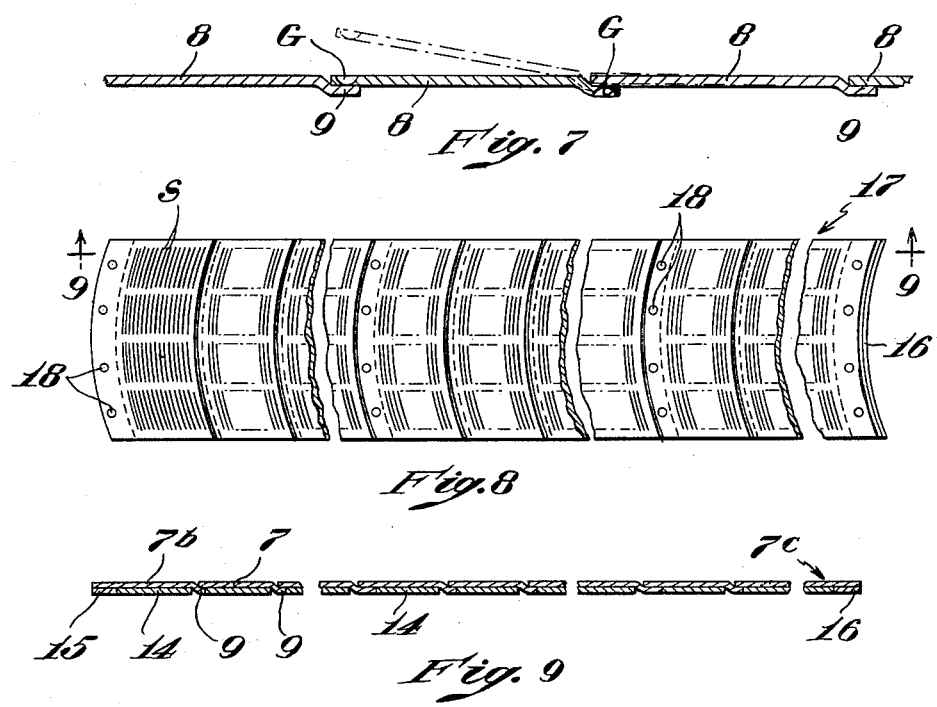
Inventor
Bertram J. Vincent
by Roberts Cushman Leroux
att'ys Patented June 29, 1954

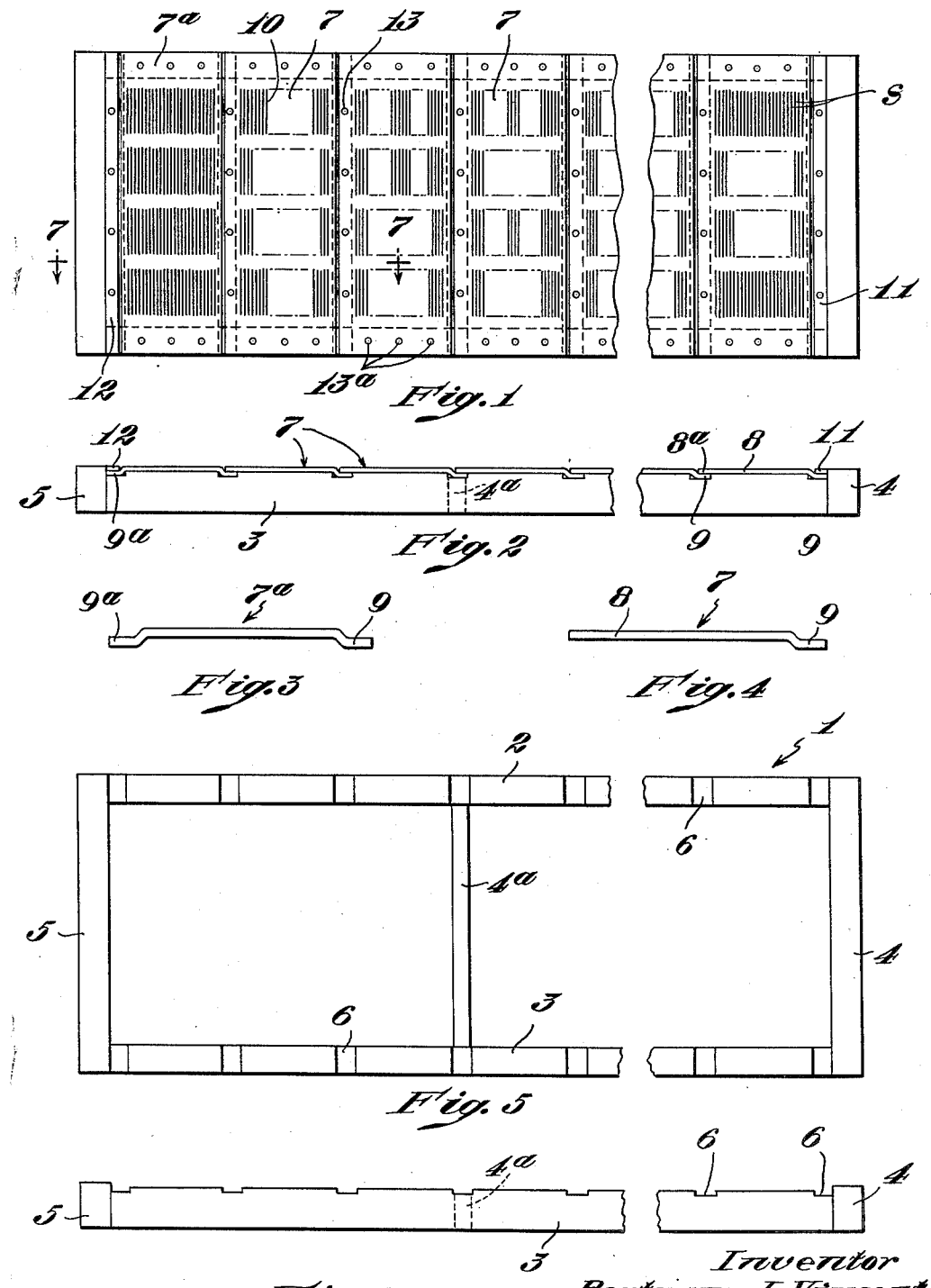

2,682,205

UNITED STATES PATENT OFFICE 2,682,205

SCREEN PLATE FOR PAPERMAKING MACHINES

Bertram J. Vincent, Leominster, Mass.

Application June 28, 1949, Serial No. 101,852

5 Claims. (Cl. 92—31)

This invention pertains to screen plates for use in paper and pulp-mill machinery, and more especially to a plate of sectional type and to a novel screen section for use in such a plate.

As one step in the preparation of stock for delivery to a paper-making machine the stock is passed through a screen plate designed primarily to remove impurities. To facilitate the screening or filtering operation, a diaphragm is arranged immediately below the screen plate, the diaphragm being vibrated vertically with an amplitude of vibration of the order of ½ inch and at the rate of approximately 600 complete vibrations per minute, thus creating rapidly alternating suction and pressure effects below the screen plate, the first tending to draw the stock down through the screen plate and the second tending to force air up through the screen plate, thereby to keep the screen openings clear. Paper mills commonly run twenty-four hours per day, without stopping for Sundays or holidays. The uninterrupted series of tremors caused by the vibrating diaphragm create stresses in the adjacent parts, particularly in the screen plates, which tend to crystallize the parts and eventually to cause breakage.

Customarily, the individual screen plates have been of a width of approximately 12 inches and of a length of approximately 43 inches. These plates must be of rust-resistant material, capable of withstanding the corrosive effects of the chemicals found in the paper stock. For this reason, among others, the plates have usually been made of brass or bronze. In order to obtain the requisite stiffness, these brass or bronze plates are approximately $\frac{3}{8}$ inch thick and, at the location of each proposed filtering slot, the plate is relief-cut at its underside, by milling out a channel of upwardly decreasing width, to a depth (measured from the undersurface of the plate) such that a thickness of approximately $\frac{1}{16}$ inch of metal intervenes between the channel and the top surface of the plate. The filtering slots, of the order of 0.004 to 0.050 inch in width, are now cut in the plate, each slot extending from the top surface of the plate to the corresponding relief channel, the individual slots being of the order of from 2 to 5 inches long and with a transverse spacing of the order of from 4 to 8 slots per inch.

While brass or bronze has an inherent toughness which enables it to withstand for almost limitless periods the effects of vibration, above referred to, these materials are not resistant to abrasion nor as resistant to corrosion as might be desired, and the fiber-bearing stock, flowing through the slots in these plates, rapidly abrades the material of the plate so that, after a comparatively short period of use, the slots become too wide for effective filtration and the entire plate must be replaced. These large plates, each with a multitude of milled grooves and slots, are expensive. In large mills several thousands of such plates may be in use at one time and thus the cost of replacement becomes a very substantial factor in the manufacturing costs.

It has heretofore been proposed to divide these plates into a large number of small independent sections, all held in proper relative position by a supporting frame, and it has further been proposed to make each independent section of sheet stainless steel, using steel of approximately $\frac{1}{16}$ inch thick and cutting the filtering slots through the entire thickness of this sheet material (without first forming relief channels at its underside). According to this procedure, the thickness of the metal at each filtering slot is the same as in the old customary forms of plate, and, by eliminating the relief milling operation, the cost of manufacture is substantially reduced. Furthermore, since stainless steel is far more resistant to abrasive wear than brass or bronze, the resultant plate section, in theory at least, should wear much longer, thus increasing the useful life of the plate section and, in this respect, further reducing cost, as compared with the old practice. However, stainless steel in flat sheet form, of the thickness just referred to, is not stiff enough for the purpose, and, in prior attempts to use this material, each plate section has been made with its marginal portion turned down at right angles to the upper surface of the plate to provide a vertical stiffening flange or web, the flanges of adjacent sections being disposed in close contact with each other in assembling the several plate sections to form the complete filter plate. However, in practice it has been found that these stainless steel sections, with their margins bent sharply down at right angles to the upper surface of the plate, are very subject to cracking. Apparently the sharp bending of this stiff hard material causes an initial work hardening, if not actually developing incipient cracks, and, when the plate is subjected to the uninterrupted vibration to which it is exposed during use, the metal crystallizes and breaks. The breaks are of most frequent occurrence near the opposite ends of the plate section, the cracks usually extending from the filtering slots outwardly through the right angular bend in the section, although they do occur at other points. Such cracks result in the widening of the slot from which the crack extends. In some cases, the metal, intervening between adjacent slots, actually drops out. The substantial widening of a slot, as the result of cracking, causes imperfect filtration in the same way as when, in the old forms of plate, the slots are widened by abrasion. In cases where parts of the plate actually fall out, the result is the passage of great quantities of impurities through the screen which may result in the spoiling of a large amount of paper before the break is discovered. This probability of cracking and breaking of the flanged plate sections deters paper manufacturers from using these stainless sectional plates, although in theory, as above noted, such plates should have many advantages. In consequence, many mills still adhere to the use of the old brass and bronze plates in which the wear is gradual and may be foreseen, as contrasted with the sudden and unpredictable breakage of the vertically flanged stainless steel plates with consequent substantial losses to the manufacturer.

One object of the invention is to provide a filter plate of sectional type in which stainless steel is employed as the filter material, but having the stainless steel section so devised and supported as to avoid the weaknesses inherent in prior constructions, and to provide reasonable assurance of a long period of use without breakage. A further object is to provide a sectional filter plate comprising a plurality of independent sections, each of stainless steel and so devised as to afford the requisite stiffness and to insure a uniformly smooth and horizontal upper surface without undue obstruction of the filtering area and without necessitating the exposure of the metal to harsh bending or to damaging stresses during the preparation of the section. A further object is to provide a sectional filter plate so designed as to eliminate the possibility of seepage at the joints between contiguous joints. A further object is to provide a sectional plate wherein each individual section may be of sheet material of uniform thickness and in which the filtering slots extend through the entire thickness of the material, but which is stiff enough to prevent bouncing of the layer of stock resting on the plate, although, at the same time, being flexible to the extent that it is not injured by the cumulative effects of vibrational stresses. A further object is to provide a sectional plate in which the individual sections are of stainless steel or material having similar wear and corrosion resistance, and so designed as to obviate the necessity for crossbrace frame members at all of the joints between the contiguous sections. A further object is to provide sectional filter plates in which adjacent sections are normally held in substantially leaktight contact with each other, but so arranged as to permit one section to be removed without disturbing other sections. A further object is to provide a sectional filter plate of simple and inexpensive type wherein the supporting frame is a rectangular open structure which may be devoid of transverse braces or crossbars intermediate its ends, the plate sections being so devised as to insure the requisite transverse stiffness. A further object is to provide a sectional filter plate wherein the outer longitudinal edges of the endmost plates of the series are free from the supporting frame, thereby to lessen the shock effects of vibration. A further object is to provide a filter section, for use as an element of a sectional filter plate, consisting of a unitary piece of sheet stainless steel of uniform thickness and provided with filter slots, the section being devoid of deep vertical webs or flanges but so designed as, when assembled with other plates, to provide adequate stiffness and strength. A further object is to provide a novel form of filter plate section capable of embodiment in a flat filter plate; or in a filter cylinder, such as is employed in converting mills. Other and further objects and advantages of the invention will be pointed out in the following more detailed description and by reference to the accompanying drawing wherein:

Fig. 1 is a fragmentary plan view of a screen plate embodying the present invention;

Fig. 2 is a side elevation of the screen plate of Fig. 1;

Fig. 3 is an edge elevation of an end plate section used in the screen plate of Fig. 1;

Fig. 4 is a view similar to Fig. 3 but showing one of the intermediate plate sections;

Fig. 5 is a fragmentary plan view of a frame for holding plate sections such as shown in Figs. 3 and 4;

Fig. 6 is a fragmentary side elevation of the frame of Fig. 5;

Fig. 7 is a fragmentary longitudinal section substantially on the line 7—7 of Fig. 1, but omitting the frame and to larger scale than Fig. 1, illustrating the mode of removing a section from the screen plate;

Fig. 8 is a fragmentary perspective view illustrating the invention as embodied in a screen plate for use in a cylindrical screen; and Fig. 9 is a fragmentary section substantially on the line 9—9 of Fig. 8.

Referring to the drawings, the numeral 1 (Fig. 5) illustrates a rigid frame which may be employed for supporting the plate sections of the improved screen plate. This frame, as illustrated, comprises the parallel spaced rigid side sill members 2 and 3, which may be of any suitable material but which are preferably of stainless steel. End sill members 4 and 5 are arranged to contact the ends of the sill members 2 and 3, forming butt joints with the latter, and are permanently united to the members 2 and 3 in any appropriate way, for example, by welding, thus providing a rigid structure of such shape and dimensions that it may be substituted for prior types of screen in conventional paper making machines.

As illustrated in Figs. 5 and 6, the upper edges of the side sills 2 and 3 are provided with spaced shallow recesses 6 for a purpose hereinafter described.

In accordance with the present invention, the screen proper consists of a series of independent screen sections 7 or 7a, each made from sheet material which is resistant to corrosion (when exposed to the materials used in paper making) and which is also highly resistant to abrasion. Stainless steel is, at present, the best known material having these characteristics. Preferably, sheet stainless steel of approximately $\frac{1}{16}''$ in thickness is employed. From this sheet material pieces are cut of a length such as to extend across the entire width of the frame 1. The width of these pieces, when intended to form intermediate sections of the screen may, for example, be $5\frac{1}{2}''$. Pieces to form the end sections may be sufficiently wider so that when the screen plate is to be of a conventional length of 43″, eight separate sections will make up the entire length of the plate. The conventional width of the screen plate transversely of the frame 1 is approximately 12″. However, the above dimensions are merely by way of example.

Each of the plate sections 7 and 7ª is provided with a plurality of series of narrow filtering slots S, preferably cut from the lower side upwardly, and which extend all of the way from the upper to the lower surface of the plate section and which are of substantial uniform width from top to bottom. By employing sheet metal of approximately 1/16″ in thickness, it is unnecessary to form relief cuts in the lower surface of the section, thus reducing the cost of producing the plate sections, although, in accordance with the present invention, sufficient stiffness is obtained even with this relatively thin material.

Having prepared pieces of the sheet material of the above dimensions, these pieces are subjected to a pressing operation between suitable dies so that each intermediate section 7 (Fig. 4) comprises a body portion 8 which is substantially flat and which constitutes the major portion of the section and so that each section has one of its transverse margins downwardly offset to provide a narrow supporting ledge 9 which lies in a plane such that the upper surface of the ledge is in substantially the same plane as the lower surface of the body portion of the section. The ledges 9 may, for example, be ⅜″ wide.

The end section 7ª (Fig. 3) which takes the place of the intermediate section 7 at the left-hand end of the screen plate, as viewed in Fig. 1 is provided in the same manner as just described with the marginal supporting ledge 9 at one edge and with a similar marginal supporting ledge 9ª at the opposite edge. The pressing operation, whereby the ledges 9 and 9ª are formed, does not involve any sharp bending or severely strain the metal, which does not exhibit any of the effects consequent upon harsh working operations.

Having prepared the plate sections 7 and 7ª as described, they are assembled with the frame 1 so that the downwardly offset portion or ledge 9 of each section rests in one of the corresponding recesses 6 in the opposite sills 2 and 3, with the edge 8ª of the body portion 8 of the next adjacent section resting upon the ledge 9. As thus arranged, the upper surfaces of the body portions of the several plate sections are flush and lie in the same horizontal plane.

In order that this horizontal upper surface may continue without interruption from the endmost plate sections to the upper surfaces of the end sills 4 and 5, a cover plate 11 is arranged to overlie the ledge 9 of the right-hand plate of the series (Fig. 2) while a similar cover plate 12 overlies the ledge 9ª of the left-hand plate section 7ª of the series.

It will be noted that by reason of the overlapping of the edge portion 8ª of each plate section with the ledge 9 of the next plate section, there is provided at the junction between adjacent plates a two-ply thickness of the material which constitutes a stiffening rib extending transversely across from one side sill to the other. The stiffness of this rib results not only from the two-ply construction but also from the downward bend of the metal where the ledge joins the body portion of the plate.

Having assembled the several plate sections in the frame as above described, the portion 8ª of each section is spot-welded to the ledge 9 of the next section as shown at 13, for example, at four or five points transversely of the screen plate. Likewise, the opposite ends of each plate section are spot-welded, as indicated at 13ª to the upper surfaces of the sills 2 and 3 intermediate the recesses 6. However, the part of each plate section which overlies that part of the ledge 9 which is seated in the recess 6 is not spot-welded to the part 9 nor to the sill. Neither are the ledges 9 and 9ª of the endmost plate sections welded or otherwise connected to the cover plates 11 and 12 nor to the end sills 4 or 5. Thus, there is some freedom for relative movement between the end plate sections and the ends of the frame, which avoids undue rigidity of the plate. On the other hand, although no transverse frame members be employed between the end sills 4 and 5, the stiffening rib provided by the overlap of the margins of adjacent plate sections provides sufficient stiffness of the plate to prevent bouncing of the layer of fluid resting thereon.

If at any time it be necessary to remove one of the plate sections, this may be done as indicated in Fig. 7 by grinding out the spots G at which the welding metal occurs, thus releasing one plate section from the next so that the released section may be lifted as indicated in broken lines in Fig. 7 and removed without disturbing the other plate sections.

Instead of providing a rigid frame such as that shown in Fig. 1, the plate sections may be made substantially self-supporting, as illustrated in Figs. 8 and 9. In Fig. 9 the sections 7 are substantially like the sections 7 shown in Fig. 4, each having the downwardly offset ledge portion 9 to support the margin of the next adjacent section. Narrow filler pieces 14, preferably of the same material as the plate sections, are arranged beneath the body portions of each of the plate sections 7 at opposite ends of each section, the undersurfaces of these filler pieces 14 being substantially flush with the undersurfaces of ledges 9. These pieces 14 may be spot-welded or otherwise permanently united to the sections 7, and the overlapping transverse margins of the adjacent sections are likewise spot-welded together. At the opposite ends of the series of plate sections other filler pieces 15 and 16 are arranged to underlie the transverse margins of the plate sections, with the undersurfaces of the parts 15 and 16 flush with the undersurfaces of the parts 14. The parts 15 and 16 are then spot-welded to the endmost sections. This arrangement provides a two-ply border for the series of plate sections providing sufficient thickness so that the series has substantial stiffness in all directions. As illustrated in Figs. 8 and 9, the endmost sections 7ᵇ and 7ᶜ of the series are somewhat wider than the intermediate sections and are unprovided with the ledge members 9 at their outer transverse edges which are at the respective ends of the series. If desired, holes 18 may be provided for the reception of fastening means for securing the sections to a supporting structure. As illustrated in Fig. 8, the series of plate sections, shown in Fig. 9, has been bent to arcuate form transversely so that the series may be used in a cylindrical filter.

In accordance with the present invention, the tendency to cracking is substantially eliminated since the metal is not subjected to harsh treatment in the formation of the plate sections.

While certain dimensions and thicknesses of material have herein been suggested, by way of example, it is to be understood that the invention is not limited with respect to such factors.

It may be noted that only a small portion of the area of the plate section is involved in the production of the overlap, so that a very large area of the plate section is available for the filtering slots. Moreover, the overlap of one section upon the other produces a joint which is so tight that there is very little seepage of fluid through the joint. Furthermore, the provision of the transverse stiffening rib between each pair of sections make it unnecessary to use transverse supports beneath the screen plate.

However, it is a customary practice to hold the screen plate in place by means of beveled edge bars and when these bars are assembled with the plate they exert a powerful compressive force edgewise of the plate which may possibly contribute to the formation of cracks. To relieve the plate of excessive stress from this source, the supporting frame, may, if desired, be provided with one or more rigid transverse struts $4a$ (Fig. 5) preferably located directly below one of the aforesaid stiffening ribs. The strut is not connected to the plate but merely serves to relieve the plate of undue transverse compressive stress, the plate being free throughout its entire length to absorb the shocks incident to the screening operation.

While certain desirable embodiments of the invention have been illustrated by way of example, it is to be understood that these embodiments are for the purpose of illustration only and that this invention includes all modifications and equivalents which fall within the terms of the appended claims.

I claim:

1. As an article of manufacture, a screen plate for use in paper mills and which is subjected during use to substantially uninterrupted vibration in a direction perpendicular to its upper surface and of the order of 600 cycles per minute, said plate comprising a rigid, substantially rectangular open frame including spaced parallel side sills and a pair of end sills, a series of elongate filter sections each of stainless steel of the order of $\frac{1}{16}$ inch in thickness, each section extending transversely of said frame and each having therein filtering slots extending from its upper surface to its lower surface and each of uniform width from top to bottom, one longitudinal marginal portion of each section being depressed to form a supporting ledge whose upper surface is in the same plane as the under surface of the body portion of the section, said ledges extending transversely of the side sills of the frame, said side sills having spaced recesses in their upper surfaces extending from edge to edge of each side sill, and each of a depth equal to the thickness of the sheet material and of a width substantially equaling the width of one of said ledges, the ledges of the several sections being seated in corresponding recesses with the opposite ends of the body portion of the section resting upon the upper surfaces of the respective side sills intermediate said recesses, and with the upper surfaces of the several sections forming a continuous and substantially uninterrupted flat upper surface, means uniting the ledge of one section to the margin of the next adjacent section resting upon the ledge, and means uniting the opposite ends of the body portions of the several sections to the respective side sills of the plate.

2. A screen plate according to claim 1 wherein that filtering section which is located at one end of the series has a supporting ledge at each of its longitudinal margins.

3. A screen plate according to claim 1 wherein the endmost filter sections of the series are free to move relatively to the end sills.

4. A screen plate according to claim 1 wherein the margin of the body portion of one section which rests upon the ledge of the adjacent section is spot welded at spaced intervals to the ledge but is free from the ledge at those portions of the latter which are seated in the recesses in the side sills.

5. In combination, in a screen plate for use in paper mills and which during use is subjected to substantially uninterrupted vibration in a direction substantially perpendicular to its upper surface, a rigid frame and a series of elongate filtering sections resting thereon, each of sheet stainless steel of the order of $\frac{1}{16}$ of an inch in thickness and each having therein filtering slots extending longitudinally of the section and through the entire thickness of the sheet material and of uniform width from the top surface to the bottom surface of the sheet material, each of said sections having one integral marginal portion which is depressed to lie in a plane parallel to that of the body portion of the section, with the upper face of said depressed portion in the plane of the lower surface of the body portion of the plate, said depressed portion constituting a supporting ledge on which the margin of the body portion of the plate next in the series rests, the upper faces of the assembled sections forming a continuous and substantially unbroken flat surface and the underside of the series of sections being interrupted only by spaced parallel ribs each of a thickness equal to that of the sheet metal of which the sections are formed, and means uniting the margin of each section to the ledge on which it rests.

References Cited in the file of this patent

UNITED STATES PATENTS

| Number | Name | Date |
|---|---|---|
| 226,545 | Pinder et al. | Apr. 13, 1880 |
| 238,126 | Judson | Feb. 22, 1881 |
| 313,037 | Williams | Feb. 24, 1885 |
| 959,979 | Webb et al. | May 31, 1910 |
| 981,249 | Dietrick | Jan. 10, 1911 |
| 1,055,499 | Tyson | Mar. 11, 1913 |
| 1,314,547 | Sturtevant | Sept. 2, 1919 |
| 1,729,946 | Kuehn | Oct. 1, 1929 |
| 2,015,139 | Dustan | Sept. 24, 1935 |
| 2,177,036 | Greulich | Oct. 24, 1939 |
| 2,319,487 | Baldwin | May 18, 1943 |

FOREIGN PATENTS

| Number | Country | Date |
|---|---|---|
| 4,143 | Great Britain | of 1912 |
| 519,680 | Great Britain | Apr. 3, 1940 |